(12) United States Patent
Zheng

(10) Patent No.: US 8,518,499 B2
(45) Date of Patent: Aug. 27, 2013

(54) LIQUID CRYSTAL BLUE PHASE

(75) Inventor: Zhigang Zheng, Shanghai (CN)

(73) Assignee: Empire Technology Development LLC, Wilmington, DE (US)

( * ) Notice: Subject to any disclaimer, the term of this patent is extended or adjusted under 35 U.S.C. 154(b) by 0 days.

(21) Appl. No.: 13/813,065

(22) PCT Filed: Jan. 19, 2012

(86) PCT No.: PCT/CN2012/070561
§ 371 (c)(1),
(2), (4) Date: Jan. 29, 2013

(65) Prior Publication Data
US 2013/0187091 A1    Jul. 25, 2013

(51) Int. Cl.
C09K 19/24    (2006.01)
C09K 19/20    (2006.01)
C09K 19/58    (2006.01)
C09K 19/02    (2006.01)

(52) U.S. Cl.
USPC ............... 428/1.1; 252/299.01; 252/299.64; 252/299.68

(58) Field of Classification Search
USPC ............ 252/299.01, 299.64, 299.68; 428/1.1
See application file for complete search history.

(56) References Cited

U.S. PATENT DOCUMENTS

| | | | |
|---|---|---|---|
| 7,623,214 B2 | 11/2009 | Coles et al. | |
| 2007/0258024 A1* | 11/2007 | Parri et al. | 349/96 |
| 2009/0115957 A1 | 5/2009 | Coles et al. | |

FOREIGN PATENT DOCUMENTS

| | | | |
|---|---|---|---|
| AT | 447000 T | | 11/2009 |
| AT | 481464 T | | 10/2010 |
| CN | 1934222 A | | 3/2007 |
| CN | 102010720 A | | 4/2011 |
| CN | 102517040 A | * | 6/2012 |
| EP | 1739151 A1 | | 1/2007 |
| EP | 1713880 B1 | | 10/2009 |
| EP | 1739151 B1 | | 9/2010 |
| JP | 2232056 A | | 9/1990 |
| JP | 2007533792 A | | 11/2007 |
| KR | 20070006732 A | | 1/2007 |
| WO | WO2005/075603 A1 | | 8/2005 |

OTHER PUBLICATIONS

CAPLUS 1982: 628063.*
International Search Report and Written Opinion for PCT/CN2012/070561 dated Nov. 1, 2012.
Arias et al., Azo Isocyanide Gold(I) Liquid Crystals, Highly Birefringent and Photosensitive in the Mesophase, *Inorg. Chem.* (Jun. 8, 2009), 48(13):6205-6210 (Abstract).
Bates, Bent core molecules and the biaxial nematic phase: A transverse dipole widens the optimal angle, *Chemical Physics Letters* (Apr. 2, 2007), 437(4-6):189-192 (Abstract).
Beharry et al., Fluorescence Imaging of Azobenzene Photoswitching In Vivo, *Angewandte Chemie International Edition* (Jan. 5, 2011), 50(6):1325-1327 (Abstract).
Cheung et al., Calculation of the rotational viscosity of a nematic liquid crystal, *Chemical Physics Letters* (Apr. 15, 2002), 356(1-2):140-146 (Abstract).
Coles et al., Liquid crystal 'blue phases' with a wide temperature range, *Nature* (Aug. 18, 2005), 436:997-1000 (Abstract).
Halabieh et al., Using light to control physical properties of polymers and surfaces with azobenzene chromophores, *Pure Appl. Chem.* (2004), 76(7-8):1445-1465.
Hrozhyk et al., Nonlinear optical properties of fast, photoswitchable cholesteric liquid crystal bandgaps, *Optical Materials Express* (Nov. 7, 2011), 1(5), pp. 1-27.
Iwata et al., The Influence of Thermal Property of the Polymer on the Polymer-Stabilized Blue Phase, *Molecular Crystals and Liquid Crystals* (Sep. 22, 2010), 470(1):11-18 (Abstract).
Ichimura, Photoisomerisation behavior of azobenzene crystals hybridised with silica nanoparticles by dry grinding, *Chemical Communications* (Mar. 25, 2010), 46:3295-3297 (Abstract).
Ikegami et al., Mechanism of Cis-to-Trans Isomerization of Azobenzene: Direct MD Study, *J. Phys. Chem. A* (May 13, 2003), 107(22):4555-4562 (Abstract).
Kikuchi et al., Polymer-stabilized liquid crystal blue phases, *Nature Materials* (Sep. 2, 2002), 1:64-68 (Abstract).
Kikuchi, Liquid Crystalline Blue Phases: Liquid Crystalline Functional Assemblies and their Supramolecular Structures, *Structure & Bonding* (Apr. 28, 2008), 128:99-117 (Abstract).
Kumar et al., Synthesis and Photoisomerization Characteristics of a 2,4,4'-Substituted Azobenzene Tethered to the Side Chains of Polymethacrylamide, *Macromolecules* (Apr. 1, 2006), 39(9):3217-3223 (Abstract).
Liu et al., Optically tuneable blue phase photonic band gaps, *Appl. Phys. Lett.* (Mar. 23, 2010), 96:121103-121105 (Abstract).
Liu et al., Photoelectrochemical information storage using an azobenzene derivative, *Nature* (Oct. 18, 1990), 347:658-660 (Abstract).
Lu et al., Femtosecond Fluorescence Dynamics of Rotation-Restricted Azobenzenophanes: New Evidence on the Mechanism of trans → cis Photoisomerization of Azobenzene, *J. Phys. Chem. A* (Feb. 18, 2005), 109(10):2090-2099 (Abstract).
Ma et al., Light-driven nanoscale chiral molecular switch: reversible dynamic full range color phototuning, *Chemical Communications* (Mar. 15, 2010), 46:3463-3465 (Abstract).
Mathews et al., Light-Driven Reversible Handedness Inversion in Self-Organized Helical Superstructures, *J. Am. Chem. Soc.* (Dec. 2, 2010), 132(51):18361-18366 (Abstract).
Muraoka et al., Light-Driven Open-Close Motion of Chiral Molecular Scissors, *J. Am. Chem. Soc.* (Apr. 18, 2003), 125(19):5612-5613 (Abstract).

(Continued)

*Primary Examiner* — Shean C Wu
(74) *Attorney, Agent, or Firm* — Pepper Hamilton LLP

(57) ABSTRACT

Methods of forming a liquid crystal blue phase from composite materials comprising a chiral nematic liquid crystal host and an azobenzene-based bent-shape molecule are described. The composite materials quickly transfer from the liquid crystal blue phase to an isotropic phase under electromagnetic radiation and transfer from the isotropic phase to the liquid crystal blue phase when electromagnetic radiation is removed.

32 Claims, No Drawings

(56) References Cited

OTHER PUBLICATIONS

Nishioka et al., 2',6'-Dimethylazobenzene as an efficient and thermostable photo-regulator for the photoregulation of DNA hybridization, *Chemical Communications* (Aug. 13, 2007), 42:4354-4356 (Abstract).

Norikane et al., Photochemical and Thermal *cis/trans* Isomerization of Cyclic and Noncyclic Azobenzene Dimers: Effect of a Cyclic Structure on Isomerization, *European Journal of Organic Chemistry* (Dec. 19, 2005), 2006(5):1296-1302 (Abstract).

Pieroni et al., Photoresponsive Polypeptides, *Acc. Chem. Res.* (Oct. 21, 2000), 34(1):9-17 (Abstract).

Shishido et al., Distinct Photochemical Phase Transition Behavior of Azobenzene Liquid Crystals Evaluated by Reflection-Mode Analysis, *J. Phys. Chem. B* (Apr. 10, 1997), 101(15):2806-2810 (Abstract).

Srinivasan et al., Photo-switching and nonlinear optical behaviors of center linked bent-core azobenzene liquid crystalline polymers, *Journal of Materials Science* (Aug. 1, 2011), 46(15):5029-5043 (Abstract).

Tang et al., Synthesis and characterization of photo- and pH-responsive nanoparticles containing amino-substituted azobenzene, *Journal of Materials Chemistry* (Sep. 20, 2010), 20(41):913-9139 (Abstract).

Tsutsumi et al., Photochemical Phase Transition Behavior of Nematic Liquid Crystals with Azobenzene Moieties as Both Mesogens and Photosensitive Chromophores, *J. Phys. Chem.* (Feb. 20, 1997), 101(8):1332-1337 (Abstract).

Urbas et al., Optically Switchable Liquid Crystal Photonic Structures, *J. Am. Chem. Soc.* (Oct. 2, 2004), 126(42):13580-13581 (Abstract).

White et al., Electrically switchable, photoaddressable cholesteric liquid crystal reflectors, *Optics Express* (Jan. 4, 2010), 18(1):173-178.

White et al., Polymer stabilization of phototunable cholesteric liquid crystals, *Soft Matter* (Jul. 23, 2009), 5(19):3623-3628 (Abstract).

White et al., Phototunable Azobenzene Cholesteric Liquid Crystals with 2000 nm Range, *Advanced Functional Materials* (Sep. 17, 2009), 19(21):3484-3488 (Abstract).

Yoshida et al., Nanoparticle-Stabilized Cholesteric Blue Phases, *The Japan Society of Applied Physics* (Nov. 27, 2009), 2:121501.1-121501.3.

Zhang et al., Optical characterization of polymer liquid crystal cell exhibiting polymer blue phases, *Optics Express* (Jul. 27, 2007), 15(16):10175-10181 (Abstract).

Zheng et al., Wide blue phase range of chiral nematic liquid crystal doped with bent-shaped molecules, *New Journal of Physics* (Nov. 10, 2010), 12:13108-13117.

* cited by examiner

LIQUID CRYSTAL BLUE PHASE

CLAIM OF PRIORITY

This application is a U.S. national stage filing under 35 U.S.C. §371 of International Application No. PCT/CN2012/070561 filed Jan. 19, 2012 entitled "Liquid Crystal Blue Phase" the disclosure of which is incorporated by reference in its entirety.

BACKGROUND

The liquid crystal blue phase is a thermotropic mesophase, usually existing between the isotropic phase and the chiral nomatic phase that was first identified in an 1888 report describing the melting behavior of cholesteryl benzoate. The report noted that the substance briefly turned blue as it changed from clear to cloudy upon cooling. The structure of the liquid crystal blue phase is formed by double-twisted cylinders, which are self-assembled and form three dimensional cubic lattices. Such an arrangement endows the liquid crystal blue phase with special properties, such as optical isotropy, tunable reflection of circular polarized light with certain wavelengths, microsecond response, etc. These properties enable many potential applications of liquid crystal blue phase including high efficiency flat panel displays, fast response optical devices and improved laser techniques. Practical applications using the liquid crystal blue phase have been limited by their stability only in a narrow temperature range (typically about 1 K).

Photoisomerization materials isomerize with irradiation at a certain wavelength, which when present in a liquid crystal, can lead to rotation of the liquid crystals and cause phase transitions. To date, phase transitions of liquid crystals initiated by photoisomerization materials have needed at least 90 seconds, while the recovery time in a dark environment is at least 8 hours.

SUMMARY

This disclosure is not limited to the particular systems, devices and methods described, as these may vary. The terminology used in the description is for the purpose of describing the particular versions or embodiments only, and is not intended to limit the scope. While various compositions and methods are described in terms of "comprising" various components or steps (interpeted as meaning "including but not limited to"), the compositions and methods can also "consist essentially of" or "consist of" the various components and steps, and such terminology should be interpreted as defining essentially closed-member groups.

Embodiments describe a composite material which forms a liquid crystal blue phase, methods for preparing the liquid crystal blue phase, and devices comprising the composite material. The liquid crystal blue phase has a stable temperature range of equal to or greater than about 20° C. The composite material transitions from the liquid crystal blue phase to an isotropic phase when subjected to electromagnetic radiation, and from the isotropic phase to the liquid crystal blue phase faster than previously reported materials.

In an embodiment, a composite material comprises a chiral nematic liquid crystal host and at least one compound (I), wherein exposure of the composite material to electromagnetic radiation induces a transition from a liquid crystal blue phase to an isotropic phase.

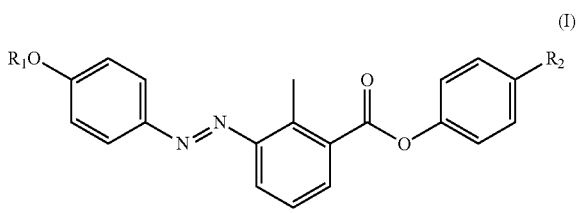

In an embodiment, a method of preparing a liquid crystal blue phase comprises: providing a mixture of at least one compound (I) and a chiral nematic liquid crystal host; heating the mixture an isotropic phase; and cooling the heated mixture to provide the liquid crystal blue phase.

In an embodiment, a display device comprises a composite material, wherein the composite material comprises a chiral nematic liquid crystal host and at least one compound (I). In these embodiments, the display device may be a blue phase mode liquid crystal display with improved fabrication costs relative to traditional liquid crystal displays.

In an embodiment, an information storage device comprises a composite material, wherein the composite material comprises a chiral nematic liquid crystal host and at least one compound (I). In these embodiments, the information storage device may be an optical disc comprising at least one layer of the composite material embedded in a transparent substrate.

DETAILED DESCRIPTION

Described herein is a composite material comprising a chiral nematic liquid crystal and an azobensone-based bent-shaped molecule such as compound (I), which forms a liquid crystal blue phase. The composite material transitions from the liquid crystal blue phase to an isotropic phase when subjected to electromagnetic radiation and from the isotropic phase to the liquid crystal blue phase faster than previously reported materials. The liquid crystal blue phase has a stable temperature range of equal to or greater than about 20° C. Methods for preparing the liquid crystal blue phase, a display device comprising the composite material, and an information storage device comprising the composite material are further described.

In embodiments, compound (I) may have the structure:

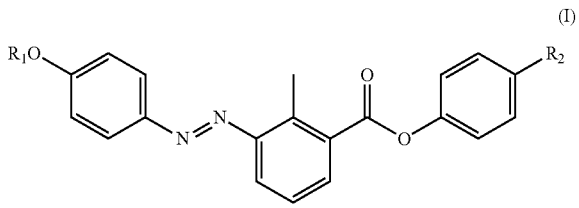

wherein $R_1$ and $R_2$ may each be independently selected from aliphatic hydrocarbons comprising 1 to 10 carbons. In some embodiments, $R_1$ and $R_2$ may each be independently selected from alkyl chains comprising 1 to 10 carbons. In some embodiments, $R_1$ is $C_4H_9$ and $R_2$ is $C_5H_{11}$.

Azobenzene-based molecules, like compound (I), may photoisomerize when subjected to electromagnetic radiation and may revert to the resting state when the electromagnetic radiation is removed. In these molecules, photoisomerization may also be termed cis/trans inversion about the N=N double bond. In embodiments, exposing a solution comprising an azobenzene-based bent-shaped molecule such as compound (I) to electromagnetic radiation may cause the absorbance properties of the solution to change. These spectral changes may indicate reversible changes in the conjugation of the azobenzene-based bent-shaped molecule resulting from photoisomerization triggered by the applied electromagnetic radiation, and recovery of the chemical geometry in the dark. In these embodiments, the intensity of an absorbance peak observed in an UV-Visible absorption spectrum may decrease and may be blue-shifted (a decrease in wavelength) with prolonged irradiation. Removing the electromagnetic radiation from the solution may cause a rise in the intensity and a red-shift of the effected absorbance peak. In some embodiments, the UV-Visible may comprise an absorbance peak of about 360 nm to about 370 nm. In these embodiments, irradiating the solution with electromagnetic radiation comprising light with a wavelength of about 365 nm may cause the absorbance peak of about 360 nm to about 370 nm to decrease in intensity and to be blue-shifted by about 30 nm (to about 330 nm to about 340 nm) with continued irradiation.

In an embodiment, a composite material capable of forming a liquid crystal blue phase may comprise a chiral nematic liquid crystal and an azobenzene-based bent-shaped molecule such as compound (I). In embodiments, the liquid crystal blue phase of the composite material may have a stable temperature range of about 10° C. to about 60° C. In some embodiments, the liquid crystal blue phase of the composite material may have a stable temperature range of about 20° C. Compared to typical ranges of only a few degrees, this improved range of stability for the liquid crystal blue phase may facilitate the use of composite materials in, for example, display and information storage applications.

In an embodiment, exposing a composite material comprising a chiral nematic liquid crystal host and an azobenzene-based bent-shaped molecule such as compound (I) with electromagnetic radiation may cause a photoinduced phase transition from a liquid crystal blue phase to an isotropic phase. In embodiments, removing electromagnetic radiation from the composite material may cause a phase transition from an isotropic phase to a liquid crystal blue phase. In further embodiments, a pattern comprising liquid crystal blue phase regions and isotropic phase regions may be made in the composite material by exposing the composite material to electromagnetic radiation through a patterned photomask. This ability to pattern the composite material may facilitate applications such as display devices and information storage devices to incorporate the composite material. In some embodiments, the patterned photomask may be configured to create a striped pattern comprising alternating liquid crystal blue phase regions and isotropic phase regions in the composite material.

In embodiments, the composite material may be irradiated with electromagnetic radiation having at least enough energy to excite a compound (I) to an electronically excited state. In these embodiments, compound (I) may undergo photoisomerization from the trans isomer to the cis isomer. In some embodiments, the composite material may be irradiated with electromagnetic radiation comprising light with a wavelength of about 365 nm.

In embodiments, the trans isomer of the azobenzene-based bent-shaped molecule such as compound (I) is bent and leads to biaxiality. Coupling between the chirality of the chiral dopant and the biaxiality of compound (I) may contribute to formation and stabilization of a double-twisted arrangement leading to a liquid crystal blue phase for the composite material. In some embodiments, exposure of the composite material to electromagnetic radiation may cause the colorful platelets of the liquid crystal blue phase to disappear gradually and a number of bright beads, indicative of a chiral nematic liquid crystal, to appear. Electromagnetic radiation may induce photoisomerization of compound (I) to the almost linear cis isomer. The change in molecular geometry may decrease the biaxiality of compound (I) and its coupling effects with the chiral dopant, and may thereby destabilize the fragile double twisted arrangement of the liquid crystal blue phase causing a transition to the single twisted chiral nematic liquid crystal. Extended exposure to electromagnetic radiation may cause destabilization of the single twisted arrangement due to increasing amounts of the cis isomer, and the chiral nematic liquid crystal may transition to the isotropic phase. In embodiments, removal of electromagnetic radiation from the composite material may allow thermal recovery of compound (I) to the trans isomer, which may lead to a transition from the isotropic phase to the liquid crystal blue phase by reversal of the above described process. In these embodiments, the arrangements of liquid crystals may be rebuilt to the single twisted chiral nematic liquid crystal phase and then to the double-twisted cylinderical liquid crystal blue phase.

Typically, the liquid crystal blue phase exists between the isotropic phase and the chiral nematic phase; however, the order of the thermotropic mesophases may be disrupted in the composite material. In some embodiments, the transition of the composite material from the liquid crystal blue phase comprises a transition from the liquid crystal blue phase to a chiral nematic phase and then to the isotropic phase. In some embodiments, the transition of the composite material from the isotropic phase comprises a transition from the isotropic phase to a chiral nematic phase and then to the liquid crystal blue phase.

In embodiments, the time for the phase transition from the liquid crystal blue phase to the isotropic phase may depend on the thickness of the composite material, the intensity of the electromagnetic radiation, the temperature, or combinations thereof. Each of these may affect the amount of electromagnetic radiation absorbed by the material and the isomerization rate. In some embodiments, the composite material may transition from the liquid crystal blue phase to the isotropic phase in about 20 seconds to about 180 seconds. In some embodiments, the composite material may transition from the liquid crystal blue phase to the isotropic phase in about 30 seconds. Specific examples of time include about 20 seconds, about 30 seconds, about 60 seconds, about 90 seconds, about 120 seconds, about 150 seconds, about 180 seconds, and ranges between any two of these values. In embodiments, the composite material may transition from the isotropic phase to the liquid crystal blue phase in about 30 minutes to about 180 minutes. In some embodiments, the composite material may transition from the isotropic phase to the liquid crystal blue phase in about 30 to about 90 minutes. Specific examples of time include about 30 minutes, about 60 minutes, about 90 minutes, about 120 minutes, about 150 minutes, about 180 minutes, and ranges between any two of these values.

In an embodiment, a composite material may comprise a chiral nematic liquid crystal host and an azobenzene-based bent-shaped molecule such as compound (I). In some embodiments, the chiral nematic liquid crystal host may comprise about 50 weight percent to about 75 weight percent eutectic nematic crystals and about 25 weight percent to about 50 weight percent chiral dopant. In other embodiments, the chiral nematic liquid crystal host may comprise about 67 weight percent eutectic nematic liquid crystals and about 33 weight percent chiral dopant. In embodiments, the composite material may comprise about 2 weight percent to about 20 weight percent of the azobenzene bent-shaped molecule. In some embodiments, the composite material may comprise about 7 weight percent of the azobenzene bent-shaped molecule.

An exemplary eutectic nematic liquid crystal includes compound SLC-9023 commercially available from Slichem Co. Ltd. An exemplary chiral dopant includes compound R811 commercially available from Merck Co. Ltd. Alternate and/or additional eutectic nematic liquid crystals and chiral dopants may be used within the scope of this disclosure.

In an embodiment, a liquid crystal blue phase may be prepared by heating a mixture of least one compound (I) and a chiral nematic liquid crystal host and cooling the heated mixture. In embodiments, compound (I) may be present at about 2 weight percent to about 20 weight percent. In some embodiments, compound (I) may be present at about 7 weight percent. In embodiments, the chiral nematic liquid crystal host may comprise about 50 weight percent to about 75 weight percent eutectic nematic crystals and about 25 weight percent to about 50 weight percent chiral dopant. In some embodiments, the chiral nematic liquid crystal host may comprise about 67 weight percent eutectic nematic crystals and about 33 weight percent chiral dopant. In embodiments, the mixture may be formed at a temperature sufficient to disperse the components of the mixture. In some embodiments, the mixture may be formed at about 60° C. and held at 60° C. for about 10 minutes. In embodiments, the mixture may be heated to a temperature where it is in the isotropic phase. In some embodiments, the mixture may be heated to a temperature of about 70° C. Specific examples of heating temperature include about 30° C., about 60° C., about 90° C., about 120° C., about 150° C., about 180° C., and ranges between any two of these temperatures. In embodiments, the heated mixture may be cooled from the isotropic phase to the liquid crystal blue phase. Specific examples of cooling temperatures include about 0° C., about 20° C., about 40° C., about 60° C., about 90° C., about 120° C., and ranges between any two of these temperatures. In some embodiments, the heated mixture may be cooled from about 70° C. to about 43° C. In embodiments, the liquid crystal blue phase may have a temperature range of greater than or equal to about 20° C., and the heated mixture may be cooled to any temperature within the liquid crystal blue phase range.

The composite materials described herein may be used to improve the fabrication costs and performance of display devices. In an embodiment, a display device may comprise the composite material described in the embodiments above. In embodiments, the composite material may comprise the liquid crystal layer in a liquid crystal display. In some embodiments, the liquid crystal display may be a blue phase mode liquid crystal display. In embodiments, anisotropic alignment layers may not be required and the refresh rate may be faster than about 100 Hz.

A further application for the composite materials described herein may include information storage devices. In an embodiment, an information storage device may comprise the composite material described in the embodiments above. In some embodiments, the information storage device may be an optical disc and may comprise a layer of the composite material embedded in a transparent substrate. In embodiments, regions of the composite material may be in the liquid crystal blue phase or in the isotropic phase and a specific region of the composite material may be read as on or off, or the reverse, by an optical reader.

EXAMPLES

Example 1

Preparation of a Liquid Crystal Blue Phase

To a mixture containing 67 weight percent eutectic nematic liquid crystals (SLC-9023 from Slichem Co. Ltd) and 33 weight percent chiral dopant (R811 from Merck Co. Ltd), 7 weight percent of compound (II) was added. The mixture was stirred at 60° C. for about 10 minutes, and injected into cells with thicknesses of 5.2 μm, 9.5 μm, and 15 μm, which were labeled sample 1, sample 2, and sample 3, respectively.

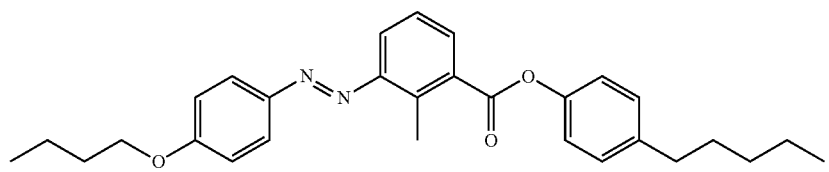

(II)

The samples were heated to an isotropic state at 70° C., and then cooled to 43° C. with the rate of 1° C. per minute, to obtain the typical liquid crystal blue phase texture.

Example 2

Transition from the Liquid Crystal Blue Phase to the Isotropic Phase and Reversal The samples from Example 1 were maintained at 43° C. for at least 5 minutes to reach a thermal equilibrium, and then exposed at this temperature to a 365-nm UV source with the intensity of 1 mW per $cm^2$ for 200 seconds to induce the photoisomerization of compound (II) and transition from the liquid crystal blue phase to the isotropic phase. After the exposure, the samples were conserved in a dark environment at the same temperature of 43° C., and the cis-trans recovery took place. The table below shows the time required for each sample to transition from the liquid crystal blue phase to the chiral nematic liquid crystal phase (BP→N*), from the chiral nematic liquid crystal phase to the isotropic phase (N*→Iso), from the isotropic phase to the chiral nematic liquid crystal phase (Iso→N*), and from the chiral nematic liquid crystal phase to the liquid crystal blue phase (N*→BP). The required exposure time for phase transition is extended with increased material-thickness. Such phenomenon is mainly caused by the difference of light absorption in the three samples. There was almost no difference among the three samples for the recovery time, because it is only dependent on the chemical structure of compound (II).

| Sample | Thickness (μm) | BP → N* (s) | N* → Iso (s) | Iso → N* (min) | N* → BP (min) |
|---|---|---|---|---|---|
| 1 | 5.2 | 30 | 45 | 20 | 70 |
| 2 | 9.5 | 50 | 70 | 20 | 70 |
| 3 | 15.0 | 80 | 95 | 20 | 70 |

Example 3

Transition from the Liquid Crystal Blue Phase to the Isotropic Phase Under High Flux The samples from Example 1 were maintained at 43° C. for at least 5 minutes to reach a thermal equilibrium, and then exposed at this temperature to a 365-nm UV source with the intensity of 8 mW per cm$^2$. The samples transitioned from the liquid crystal blue phase to the isotropic phase within 30 seconds.

Example 4

Fabrication of a Micropattern

The samples from Example 1 were maintained at 43° C. for at least 5 minutes to reach a thermal equilibrium, and then exposed at this temperature to a 365-nm UV source with the intensity of 8 mW per cm$^2$ through a photomask with alternating transparent and opaque lines. The samples transitioned from liquid crystal blue phase to chiral nematic liquid crystal, and then to isotropic only in the transparent regions; however, no phase transition occurred in the opaque regions.

In the present disclosure, reference is made to the accompanying figures, which form a part hereof. The illustrative embodiments described in the detailed description, FIGURE, and claims are not meant to be limiting. Other embodiments may be used, and other changes may be made, without departing from the spirit or scope of the subject matter presented herein. It will be readily understood that the aspects of the present disclosure, as generally described herein, and illustrated in the FIGURE, may be arranged, substituted, combined, separated, and designed in a wide variety of different configurations, all of which are explicitly contemplated herein.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds, compositions or biological systems, which can, of course, vary. It is also to be understood that the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or FIGURE, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," and the like include the number recited and refer to ranges which can be subsequently broken down into subranges as discussed above. Finally, as will be understood by one skilled in the art, a range includes each individual member. Thus, for example, a group having 1-3 substituents refers to groups having 1, 2, or 3 substituents. Similarly, a group having 1-5 substituents refers to groups having 1, 2, 3, 4, or 5 substituents, and so forth.

What is claimed is:

1. A composite material comprising:
a chiral nematic liquid crystal host; and
at least one compound

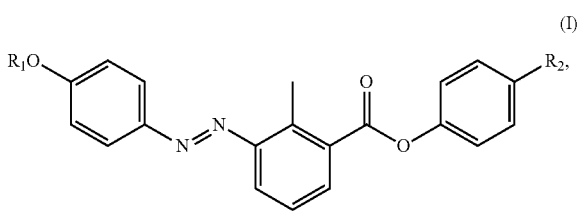

(I)

wherein $R_1$ and $R_2$ are each independently selected from aliphatic hydrocarbons comprising 1 to 10 carbons, wherein exposure of the composite material to electromagnetic radiation induces a transition from a liquid crystal blue phase to an isotropic phase, and wherein removal of electromagnetic radiation from the composite material induces a transition from an isotropic phase to a liquid crystal blue phase.

2. The composite material of claim 1, wherein the transition from the liquid crystal blue phase to the isotropic phase occurs in about 20 seconds to about 180 seconds.

3. The composite material of claim 1, wherein the transition from the isotropic phase to the liquid crystal blue phase occurs in about 30 minutes to about 180 minutes.

4. The composite material of claim 1, wherein the transition from the liquid crystal blue phase comprises a transition from the liquid crystal blue phase to a chiral nematic phase.

5. The composite material of claim 1, wherein the transition from the isotropic phase comprises a transition from the isotropic phase to a chiral nematic phase.

6. The composite material of claim 1, wherein $R_1$ and $R_2$ are each independently selected from alkyl chains comprising 1 to 10 carbons.

7. The composite material of claim 1, wherein compound (I) is present at about 2 weight percent to about 20 weight percent.

8. The composite material of claim 1, wherein the electromagnetic radiation has at least enough energy to excite compound (I) to an electronically excited state.

9. The composite material of claim 1, wherein the chiral nematic liquid crystal host comprises about 50 weight percent to about 75 weight percent eutectic nematic liquid crystals and about 25 weight percent to about 50 weight percent chiral dopant.

10. A method of preparing a liquid crystal blue phase, the method comprising:
providing a mixture of a chiral nematic liquid crystal host and at least one compound

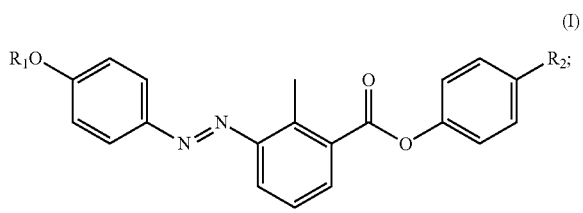

(I)

heating the mixture; and
cooling the heated mixture,
wherein $R_1$ and $R_2$ are each independently selected from aliphatic hydrocarbons comprising 1 to 10 carbons.

11. The method of claim 10, wherein $R_1$ and $R_2$ are each independently selected from alkyl chains comprising 1 to 10 carbons.

12. The method of claim 10, wherein compound (I) is present at about 2 weight percent to about 20 weight percent.

13. The method of claim 10, wherein the chiral nematic liquid crystal host comprises about 50 weight percent to about 75 weight percent eutectic nematic crystals and about 25 weight percent to about 50 weight percent chiral dopant.

14. The method of claim 10, wherein the mixing takes place at about 60° C. for about 10 minutes.

15. The method of claim 10, wherein the mixture is heated to a temperature of about 70° C.

16. The method of claim 10, wherein the heated mixture is cooled from about 70° C. to about to about 43° C.

17. A display device comprising a composite material, wherein the composite material comprises:
a chiral nematic liquid crystal host; and
at least one compound

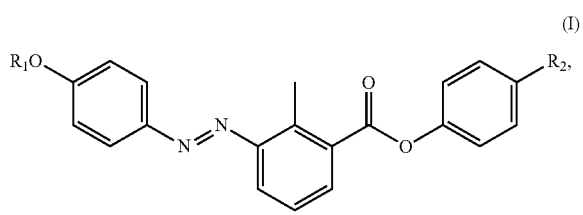

(I)

wherein $R_1$ and $R_2$ are each independently selected from aliphatic hydrocarbons comprising 1 to 10 carbons, wherein exposure of the composite material to electromagnetic radiation induces a transition from a liquid crystal blue phase to an isotropic phase, and wherein removal of electromagnetic radiation from the composite material induces a transition from an isotropic phase to a liquid crystal blue phase.

18. The display device of claim 17, wherein the transition from the liquid crystal blue phase to the isotropic phase occurs in about 30 seconds to about 180 seconds.

19. The display device of claim 17, wherein the transition from the isotropic phase to the liquid crystal blue phase occurs in about 30 minutes to about 180 minutes.

20. The display device of claim 17, wherein the transition from the liquid crystal blue phase comprises a transition from the liquid crystal blue phase to a chiral nematic phase.

21. The display device of claim 17, wherein the transition from the isotropic phase comprises a transition from the isotropic phase to a chiral nematic phase.

22. The display device of claim 17, wherein $R_1$ and $R_2$ are each independently selected from alkyl chains comprising 1 to 10 carbons.

23. The display device of claim 17, wherein compound (I) is present at about 2 weight percent to about 20 weight percent.

24. The display device of claim 17, wherein the electromagnetic radiation has at least enough energy to excite compound (I) to an electronically excited state.

25. The display device of claim 17, wherein the chiral nematic liquid crystal host comprises about 50 weight percent to about 75 weight percent eutectic nematic crystals and about 25 weight percent to about 50 weight percent chiral dopant.

26. An information storage device comprising a composite material, wherein the composite material comprises:
   a chiral nematic liquid crystal host; and
   at least one compound

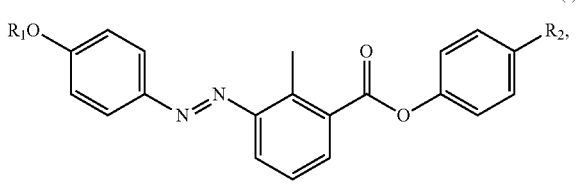
(I)

wherein $R_1$ and $R_2$ are each independently selected from aliphatic hydrocarbons comprising 1 to 10 carbons, wherein exposure of the composite material to electromagnetic radiation induces a transition from a liquid crystal blue phase to an isotropic phase, and wherein removal of electromagnetic radiation from the composite material induces a transition from an isotropic phase to a liquid crystal blue phase.

27. The information storage device of claim 26, wherein the transition from the liquid crystal blue phase to the isotropic phase occurs in about 30 seconds to about 180 seconds.

28. The information storage device of claim 26, wherein the transition from the isotropic phase to the liquid crystal blue phase occurs in about 30 minutes to about 180 minutes.

29. The information storage device of claim 26, wherein $R_1$ and $R_2$ are each independently selected from alkyl chains comprising 1 to 10 carbons.

30. The information storage device of claim 26, wherein compound (I) is present at about 2 weight percent to about 20 weight percent.

31. The information storage device of claim 26, wherein the electromagnetic radiation has at least enough energy to excite compound (I) to an electronically excited state.

32. The information storage device of claim 26, wherein the chiral nematic liquid crystal host comprises about 50 weight percent to about 75 weight percent eutectic nematic crystals and about 25 weight percent to about 50 weight percent chiral dopant.

\* \* \* \* \*

UNITED STATES PATENT AND TRADEMARK OFFICE
CERTIFICATE OF CORRECTION

| | | |
|---|---|---|
| PATENT NO. | : 8,518,499 B2 | Page 1 of 1 |
| APPLICATION NO. | : 13/813065 | |
| DATED | : August 27, 2013 | |
| INVENTOR(S) | : Zheng | |

It is certified that error appears in the above-identified patent and that said Letters Patent is hereby corrected as shown below:

In the Specification

In Column 1, Line 15, delete "nomatic" and insert -- nematic --, therefor.

In Column 1, Line 49, delete "(interpeted as meaning "including" and insert -- (interpreted as meaning "including, --, therefor.

In Column 2, Line 33, delete "azobensone-based" and insert -- azobenzene-based --, therefor.

In Column 4, Line 21, delete "cylinderical" and insert -- cylindrical --, therefor.

Signed and Sealed this
Twelfth Day of November, 2013

Teresa Stanek Rea
*Deputy Director of the United States Patent and Trademark Office*